UNITED STATES PATENT OFFICE.

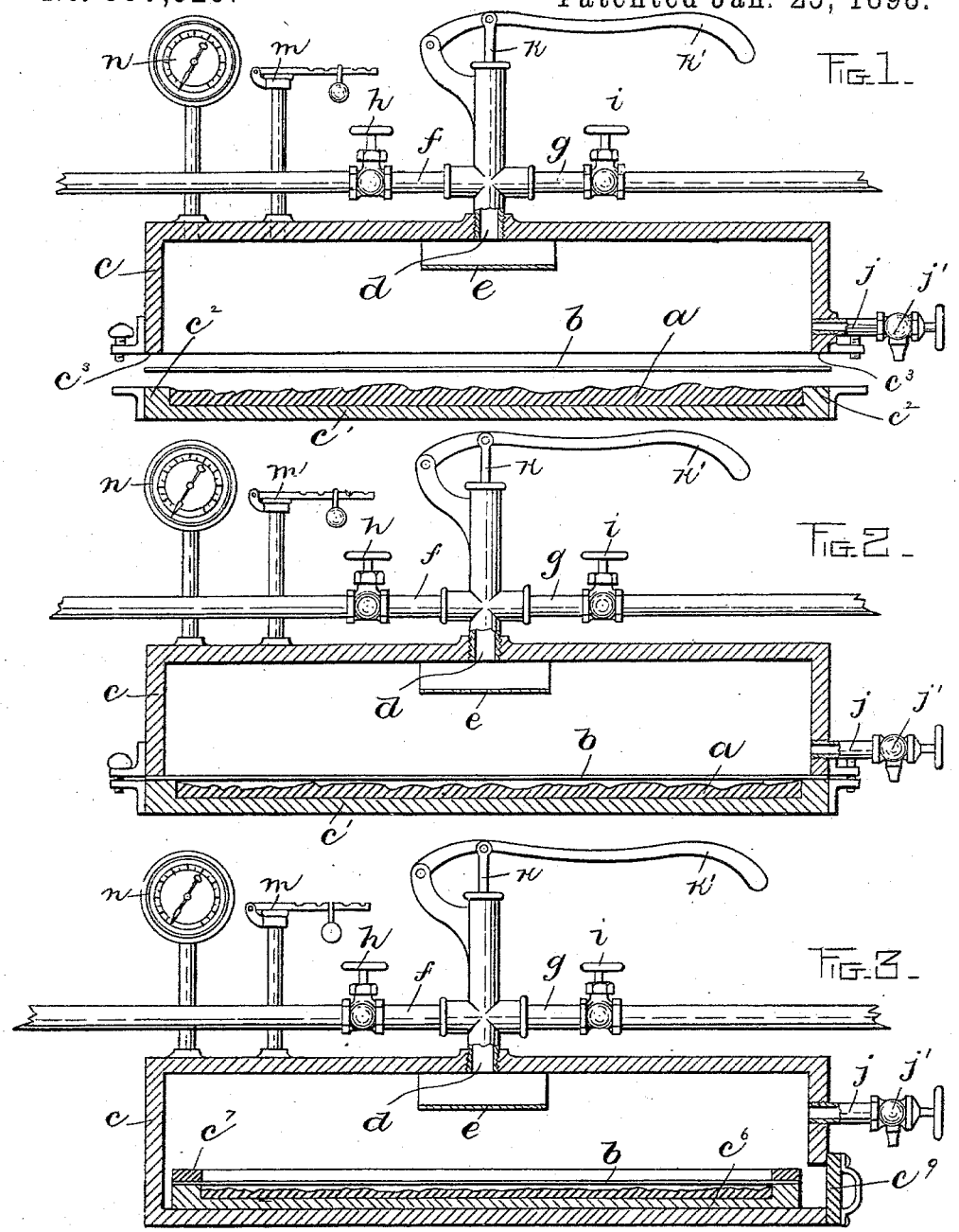

GEORGE J. BURNS AND DANIEL L. CHANDLER, OF AYER, MASSACHUSETTS; SAID CHANDLER ASSIGNOR TO SAID BURNS.

APPARATUS FOR MOLDING CELLULOID, &c.

SPECIFICATION forming part of Letters Patent No. 597,929, dated January 25, 1898.

Application filed October 17, 1896. Serial No. 609,179. (No model.)

*To all whom it may concern:*

Be it known that we, GEORGE J. BURNS and DANIEL L. CHANDLER, of Ayer, in the county of Middlesex and State of Massachusetts, have invented certain new and useful Improvements in Apparatus for Molding Celluloid, &c., of which the following is a specification.

This invention has for its object to enable material adapted to be made plastic by heat, such as celluloid formed in sheets, to be readily molded by the employment of a single die or mold instead of by the employment of male and female dies or molds, as heretofore.

The invention consists in the improved apparatus which we will now proceed to describe and claim.

Of the accompanying drawings, forming a part of this specification, Figure 1 represents a sectional view of an apparatus embodying our invention, the parts of the casing or fluid-chamber being separated. Fig. 2 represents a similar view showing the parts of the casing connected ready for operation. Fig. 3 represents a sectional view of a modified form of apparatus embodying our invention.

The same letters of reference indicate the same parts in all the figures.

In carrying out our invention we take a mold or die $a$ and place upon it a sheet $b$ of celluloid or other like material adapted to be made plastic by heat and to be conformed to the die by pressure while in a plastic condition. We secure the margin of the sheet $b$ around the die in such manner as to form a continuous fluid-tight joint around the die, causing the sheet $b$ to serve as a diaphragm excluding from all parts of the acting surface of the die the fluid which is employed to press the sheet against the die. The sheet being confined as above indicated, we subject it to the action of a body of heated fluid under pressure, using by preference water supplied by a steam-boiler and under pressure therefrom, the water being heated to the desired temperature. The heat softens the the celluloid and makes it plastic, and the pressure causes the plastic sheet to conform accurately to the configuration of the die even when the die presents undercut surfaces, the fluid acting as a flexible die conforming to all irregularities of the surface of the die $a$, so that the softened celluloid is pressed closely against all parts of said die. After the celluloid has been thus conformed to the die we substitute for the heated fluid a relatively cold fluid to harden or set the celluloid before removing it from the die, taking care to maintain sufficient fluid-pressure on the celluloid to prevent it from leaving the die while in its soft and plastic condition. We prefer to effect this substitution by shutting off the supply of the heated fluid and opening an outlet for the same and at the same time admitting a supply of relatively cold fluid, such as water, which is kept under sufficient pressure to hold the celluloid to the die. After the celluloid has been sufficiently cooled to render its form permanent the fluid-pressure is removed and the formed celluloid separated from the die.

The preferred form of apparatus for carrying out the process above indicated is shown in Figs. 1 and 2, said apparatus comprising a sectional or two-part casing composed of a body portion $c$ and a removable side piece $c'$, having suitable means, such as bolts or clamps, for attaching it to the body $c$, the two sections forming a fluid-receptacle, as shown in Fig. 2. The removable side piece $c'$ is formed as a holder for the die $a$, the inner surface of said side piece being preferably recessed, so that it presents a raised margin $c^2$ around the die $a$. Said margin $c^2$ is preferably formed as a member of a clamp, the other member of which is the edge $c^3$ of the body portion $c$, said members receiving between them the margin of the celluloid sheet $b$ and clamping it closely, so that the said sheet becomes a diaphragm, preventing access to the die of any of the fluid entering the body portion $c$ of the casing.

The casing is provided with a fluid-inlet $d$, adjacent to which, within the casing, is a baffle-plate $e$, arranged to diffuse the fluid that enters the casing and prevent it from hammering against the central portion of the celluloid sheet. $f$ and $g$ represent two conduits communicating with the inlet $d$, the conduit $f$ communicating with a source of supply of heated fluid, such as a boiler, while the conduit $g$ communicates with a source of supply of a relatively cold fluid, such as the pipes of a public water-supply system. Said conduits are provided with valves $h$ $i$, whereby they may be shut off from their respective sources of supply. $j$ represents an outlet-pipe adapted to release fluid from the casing and provided with a valve $j'$, by which it may be closed.

The operation is as follows: The removable side piece or die-holder $c'$ being removed from the casing-body $c$, the celluloid sheet $b$ is placed upon the die and the die-holder is then applied to the body $c$, the margin of the sheet being thus tightly clamped between the members $c^2$ $c^3$, so that a fluid-tight joint is formed around the die. Heated water is then admitted through the inlet $d$, the conduit $g$ and outlet $j$ being closed. The conduit $f$ may be connected with a boiler, so that the water will receive pressure from steam generated in the boiler. The sheet $b$ is softened by the heat and caused by the pressure to conform to the surface of the die. The conduit $f$ may then be shut off and the conduit $g$ opened, thus admitting relatively cold water under the pressure existing in the street-mains or under pressure exerted in any suitable way, it being desirable to continuously maintain sufficient pressure to prevent the formed celluloid from separating from the die before its form has been made permanent by cooling. The outlet-pipe $j$ may be opened sufficiently to allow the hot water in the casing to be displaced by the cold water, care being taken to prevent the too rapid escape of water through said outlet. The pressure of the water on the sheet $b$ may be increased by an auxiliary pressure device, which may be a piston $k$, operated by a lever $k'$ and working in a cylinder which is connected with the inlet $d$. The valves $h, i,$ and $j$ should be closed when this auxiliary pressure device is being operated.

A safety-valve $m$ should be employed, so that the proper temperature may be had directly from the boiler without danger of an excessive pressure on the celluloid while it is being softened and rendered sufficiently plastic to enable it to be conformed to the die.

$n$ represents a pressure-gage to indicate the degree of pressure exerted by the water on the celluloid.

We do not limit ourselves to the employment of a die-holder constructed to serve also as a movable section or part of the casing. In Fig. 3 we show a modification in which the die $a$ is placed in a movable holder $c^6$, having a clamping-frame $c^7$, adapted to secure and seal the celluloid sheet around the die. The casing has an opening to permit the insertion and removal of the die-holder and die, said opening having a detachable cover $c^9$.

It will be seen that our invention secures the following advantages over rigid male and female dies used for the purpose described:

First. One die only is used.

Second. The die may be of electrotype, and the pattern or mold may be inexpensively repeated, and thus in case of small articles enable an entire sheet to be stamped at one process. Experience has shown us that a wooden die or any material—such as cloth, lace, woven straw, or cane—is with this process often of sufficient strength for the purpose of stamping or molding.

Third. The celluloid sheet to be molded is heated by direct contact of hot water instead of indirectly by heating the die—an economy both of heat and time.

Fourth. The celluloid when molded may be cooled and set by flowing cold water through the box and across the top of the celluloid, and, unlike other processes, it is not necessary to cool the celluloid by first cooling the dies, nor is it necessary to lower the temperature of the dies or the casing more than a few degrees.

Fifth. In molding many forms the ordinary steam-pressure of the boiler from which the hot water is taken will be sufficient to press the celluloid sheet into the die, and the pressure from the usual street-main will be sufficient to retain the pressure until the water from the main shall have cooled and set the celluloid.

Sixth. In event that by reason of the thickness of the celluloid sheet or intricacy of detail of die, or both, a greater pressure is required to force the material into the die than is furnished by steam in hot-water boiling the pressure may be indefinitely increased by a simple form of pressure device connected with the inlet-pipe.

Seventh. Forms may be stamped and molded such as cannot be made by rigid male and female dies.

We claim—

1. An apparatus of the character specified, comprising a fluid-receiving chamber, consisting of two parts, a die rigidly supported by and removable from the chamber, and marginal clamping members carried by the said two parts of the chamber and adapted to hold the margin of a sheet of celluloid in position to cause said sheet to act as a diaphragm excluding the fluid in the chamber from the die.

2. An apparatus of the character specified, comprising a casing or chamber having a fluid-inlet and a removable side piece formed as a die-holder adapted to hold a die in position to coact with a fluid in said casing.

3. An apparatus of the character specified, comprising a casing or chamber, a die removable therefrom, means for clamping the margin of a sheet of celluloid around the die to cause it to exclude fluid in the chamber from the die, and two conduits communicating with said chamber and with separate sources of fluid-supply, one conduit supplying a heated fluid and the other a relatively cold fluid.

4. An apparatus of the character specified, comprising a casing or chamber, a die removable therefrom, means for clamping the margin of a sheet of celluloid around the die to cause it to exclude fluid in the chamber from the die, a conduit connecting said chamber with a source of fluid-supply, means for shutting off said conduit from the source of supply, and an auxiliary pressure device adapted to exert pressure on a charge of fluid in said chamber.

5. An apparatus of the character specified, comprising a casing or chamber having a fluid-inlet and composed of two separable parts or sections one of which is formed as a die-holder and provided with a marginal clamping member surrounding the die, while the other is provided with a complemental marginal clamping member, said members with the interposed margin of the sheet forming a fluid-tight joint whereby the sheet is caused to serve as a diaphragm preventing access of the pressure fluid to the die.

6. An apparatus of the character specified, comprising a casing or chamber, a die removable therefrom, means for holding the margin of a sheet of celluloid around the die, a fluid-inlet, two valved conduits connecting the inlet with separate sources of fluid-supply, each conduit having a valve whereby it may be shut off from its source of supply, and an auxiliary pressure device such as a pump, adapted to exert a pressure on a charge of fluid in the casing.

In testimony whereof we have signed our names to this specification, in the presence of two subscribing witnesses, this 9th day of September, A. D. 1896.

GEORGE J. BURNS.
DANIEL L. CHANDLER.

Witnesses:
WARREN H. ATWOOD,
GEORGE W. SANDERSON.